Aug. 1, 1961  F. PAPKE  2,994,257
CAMERA PROVIDED WITH BUILT-IN VIEW FINDER AND EXPOSURE METER
Filed May 14, 1959  5 Sheets-Sheet 1

INVENTOR
FRIEDRICH PAPKE
BY
ATTORNEYS

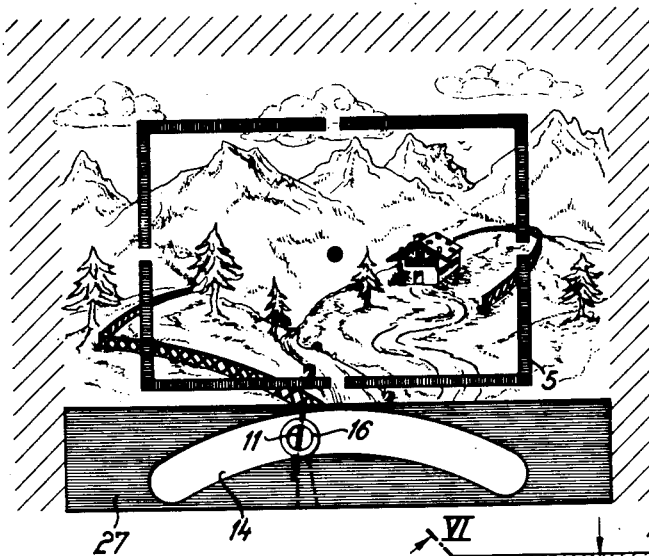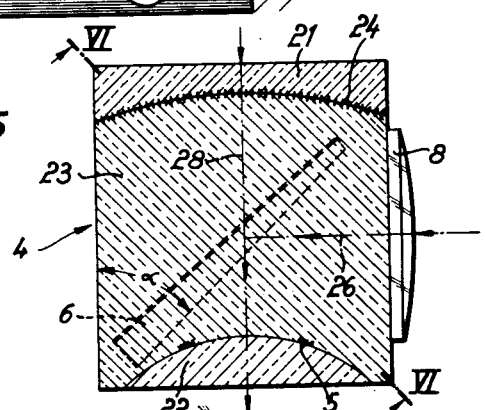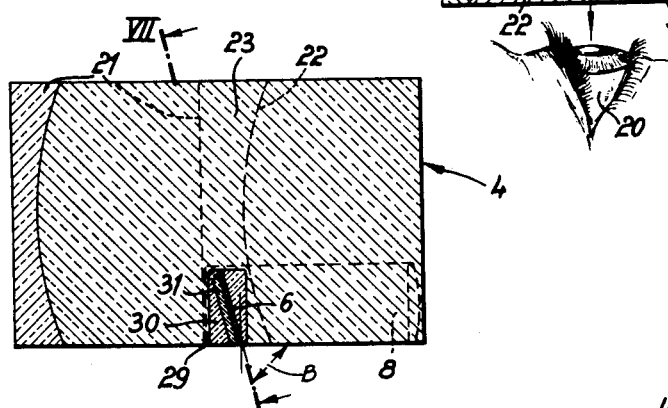

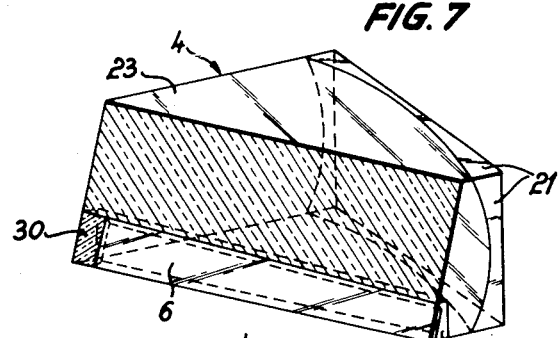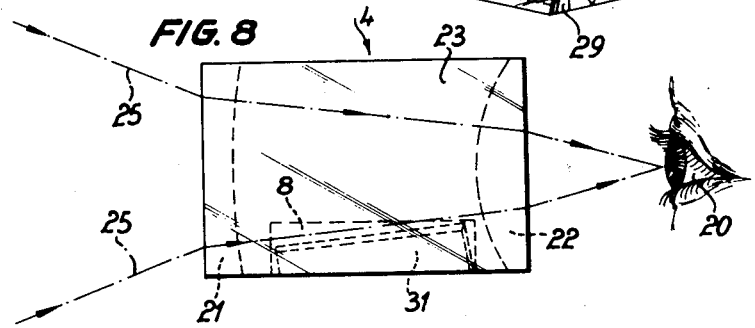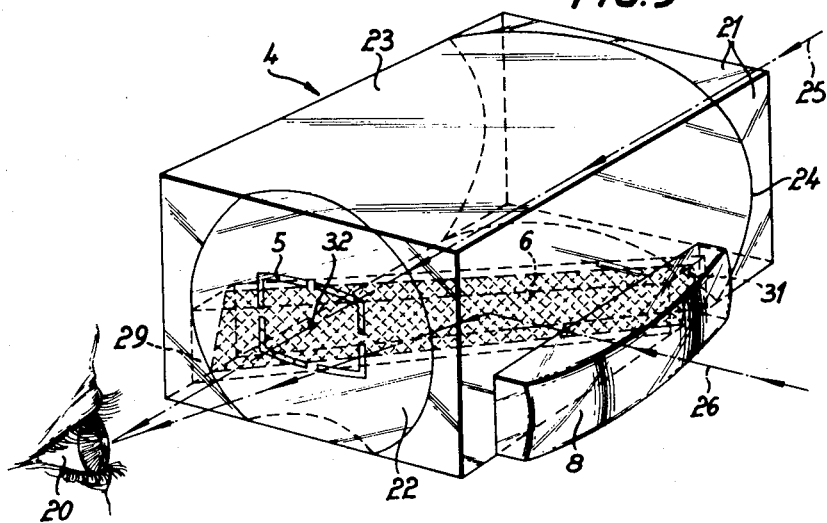

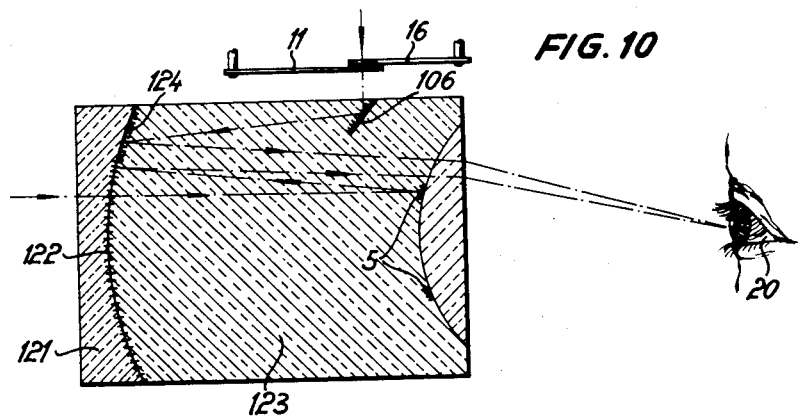
FIG. 10
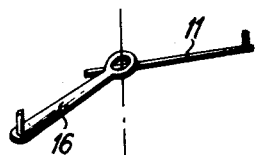
FIG. 11
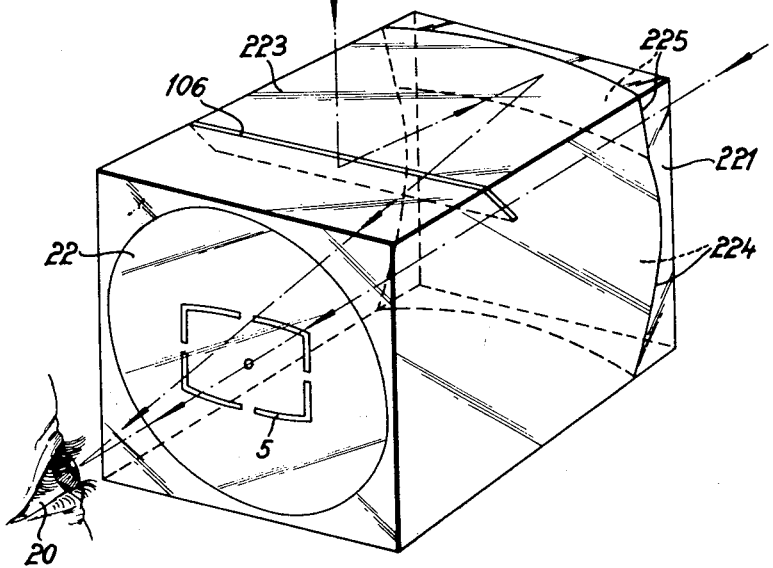
INVENTOR
FRIEDRICH PAPKE

Aug. 1, 1961  F. PAPKE  2,994,257
CAMERA PROVIDED WITH BUILT-IN VIEW FINDER AND EXPOSURE METER
Filed May 14, 1959  5 Sheets-Sheet 5
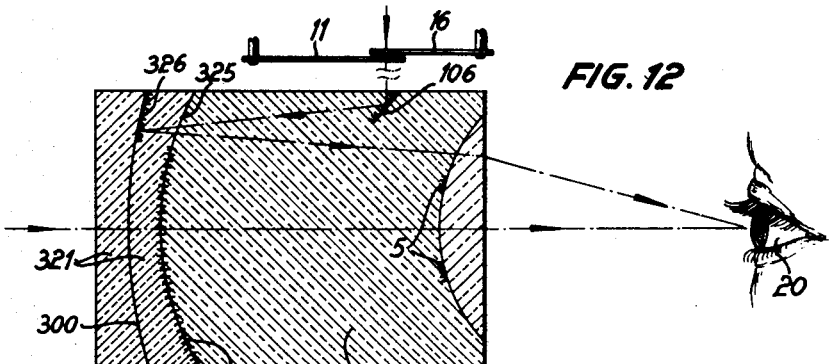
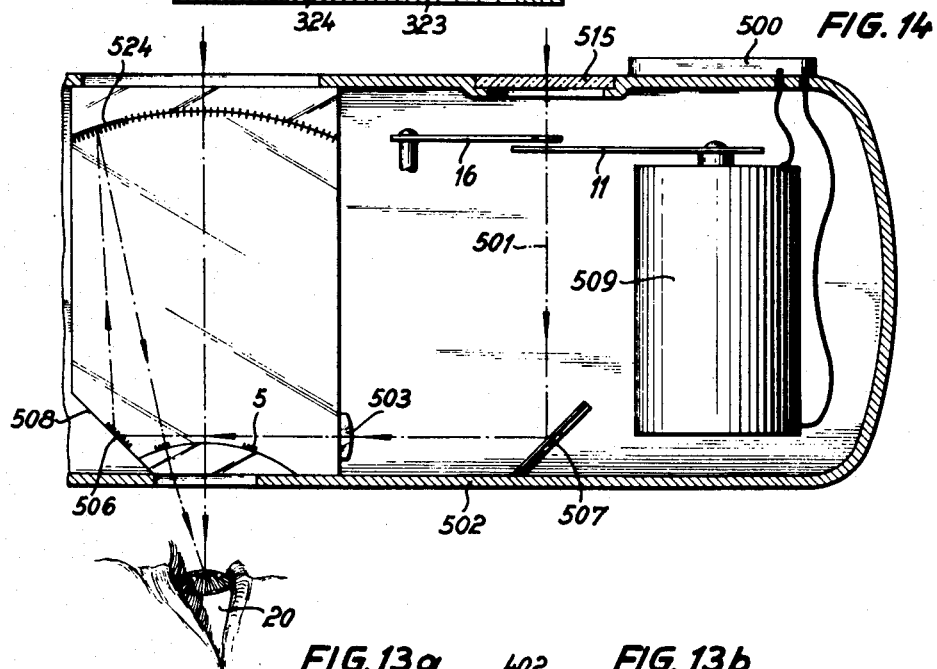
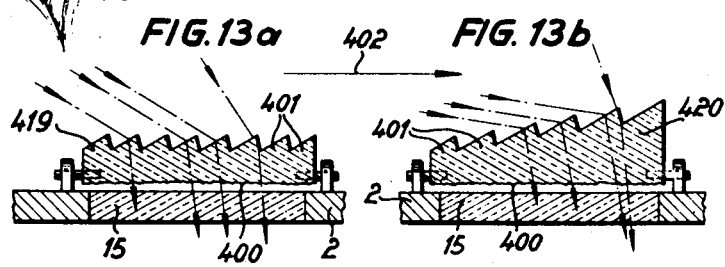
INVENTOR
FRIEDRICH PAPKE
BY
ATTORNEYS

United States Patent Office 2,994,257
Patented Aug. 1, 1961

2,994,257
CAMERA PROVIDED WITH BUILT-IN VIEW FINDER AND EXPOSURE METER
Friedrich Papke, Braunschweig, Germany, assignor to Voigtländer A.G., Braunschweig, Germany, a corporation of Germany
Filed May 14, 1959, Ser. No. 813,101
Claims priority, application Germany Sept. 19, 1958
21 Claims. (Cl. 95—10)

This invention relates to photographic cameras provided with a built-in view finder and exposure meter and it has particular relation to cameras of this type which are provided with means for permitting simultaneous observation in the viewfinder field of the indication of the exposure meter and the viewfinder image. Such systems or arrangements have the advantage that the condition of the exposure meter can be checked at the moment of picture taking so that a "precision" measurement of the exposure can be attained. Moreover, such systems are particularly effective in cameras which are provided with a coupling between the exposure meter and the organs for adjustment of the shutter and diaphragm, respectively.

Several devices, accomplishing these objects, have been known previously. For example, one of these devices reflects the pointer of an exposure meter and adjusting marks, zero-positions and the like, into a finder of the Galilei or Newton structure, over a partially permeable mirror in combination with further screening elements.

The present invention is concerned with the specific problem of carrying out such reflections in a so-called Albada finder. In addition to other benefits, this finder type has the advantage of requiring relatively little space for the reflection of the limiting frame. In carrying out the invention, it is contemplated to use an Albada finder which is built of a unitary glass block in order to meet the requirements of brilliance and freedom from reflections.

In order to attain this, it is contemplated according to the present invention that the image formation of the instrument pointer, and, if desired, of a follow-up pointer, be carried out, by means of at least one mirror arranged in the finder body, in such a manner that the pointer image is formed at infinite. At least one of these mirrors should be a plane mirror which—according to an essential feature of the invention—is inserted in a saw gap of the finder block with a cement which has the same index of refraction as the glass of the finder body. Thereby the cost of manufacture is considerably reduced, because polishing of this gap is unnecessary. At the same time, the glass body can consist of a single piece, while according to prior art methods the block would be divided so that additional processing of two surfaces would be necessary.

A further reduction of cost is attained if, according to an embodiment of the invention, the collimator lens, which brings about reflection of the pointer to infinite, is cemented directly to the finder block. Thereby the cemented glass surfaces require—like in the case of the beforementioned saw gap—only rough processing, for example by milling or grinding. An unobjectionable view through such surfaces is obtained here again by application of a cement having the same index of refraction as the glass block of the finder. It is, however, necessary that the cemented lens should have the same index of refraction as the glass body, because otherwise polishing of the cementing surface would be necessary.

A particularly favorable arrangement with omission of the collimator lens can be obtained if the image formation of the exposure meter pointers is brought about by the same mirror which is used also for reflecting the frame according to the Albada principle. This arrangement can be applied mainly to cases in which the indicating device of the exposure meter is located close to the glass block of the Albada finder. In other cases, the hollow mirror for reflecting the pointers can be applied to a surface, which joins in space the carrier surfaces for the partially permeable hollow mirror of the Albada finder, but has a different, preferably more flat, curvature. Thus, the carrier surfaces for the two hollow mirrors of different curvature can be ground on the same optical member. However, in particular cases it may be preferable to arrange the hollow mirror for forming the image of the indicating device on a particular hollow surface of the finder front member, which forms preferably a cementing surface in this member. The hollow surface, which serves for reflecting the image limiting frame and follows the beforementioned hollow surface in the direction of the light, is then left free from the partially permeable reflecting layer, on its part opposite to the mirror, in such a manner that the reflecting rays for forming the image of the pointers, can pass without being stopped.

According to a further embodiment, a real intermediate image of the exposure meter pointer is contemplated. In this case the mirror of the Albada finder serves in a certain sense as an ocular for the mirror system, which consists of a lens acting as the objective, and the mirror proper, whereby several additional mirrors have to be interposed in a manner known by itself, in order to reflect the rays into the finder, in comformity with the structural arrangement of the exposure meter and of the Albada finder. This structure of reflection has the advantage that more freedom is attained in arranging the exposure meter in the camera cap.

For the arrangement of the plane mirror in the finder body, the following preferred inclined positions come into consideration, based on vertical space coordinates, one of which represents the optical axis.

(a) In the reflection of the indicating device by means of a collimator system: an inclination of about 45° relative to the optical axis and in the other direction, which is about perpendicular thereto, an inclination of about 6°;

(b) In the reflection of the indicating device by means of a hollow mirror in the finder body: an inclination of about 90° relative to the optical axis and in the other direction, which is about perpendicular thereto, an inclination of about 45°.

In order to regulate the clearness of the pointer image in dependence on the prevailing light conditions, a diffuser disc is provided on the light-admission window in the camera cap, through which a diaphragm for limiting the pointer image is illuminated. This disc has a serrated surface in order to increase its light receiving capacity, and its surface turned toward the light-admission window is finely ground.

The appended drawings illustrate by way of example some specific embodiments of and best modes for carrying out the invention, but to which the invention is not limited.

In the drawings,

FIG. 4 illustrates, by way of example, an image of the type observed in looking into the finder;

FIG. 5 illustrates a detail of FIG. 2 on an enlarged scale;

FIG. 6 is a sectional view along line I—I in FIG. 5;

FIG. 7 is a sectional view along line II—II in FIG. 6;

FIG. 8 is a side elevation view of this finder;

FIG. 9 is a perspective illustration of the finder;

FIG. 10 is a vertical section through a finder with a different reflection of the pointer;

FIG. 11 is a perspective view of a further embodiment of the invention;

FIG. 12 is a vertical sectional view through a finder with another different reflection of the pointer;

FIGS. 13a and 13b are sectional views of diffuser discs of particular design, and FIG. 14 is a purely diagrammatical illustration of an Albada finder, into which a real intermediate image of the indicating device is reflected, as a partial top plan view of the upper side of the camera, the camera cap being cut away.

Figure 1:
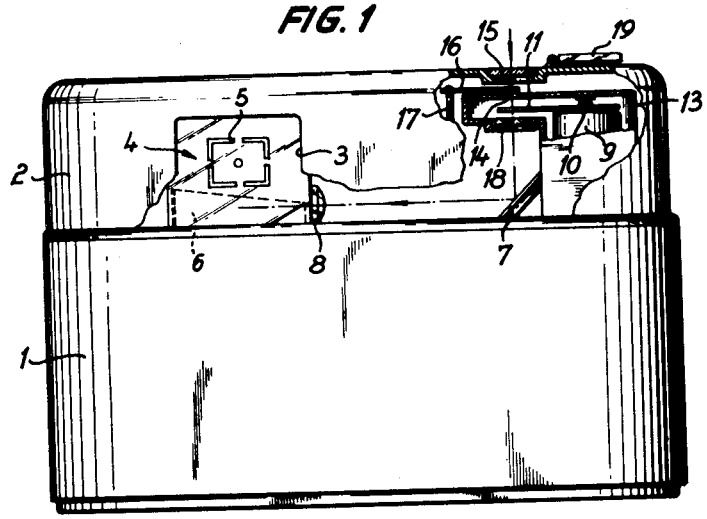
FIG. 1 is a rear elevation view of a photographic camera, the cap of which is partly broken away and in which the Albada finder and the indicating device of the exposure meter, reflected into the finder, are shown.

Referring now to the drawings in detail, in FIG. 1 reference symbol 1 denotes the camera body. The partly broken away camera cap is shown at 2, the insight window of the finder at 3, the glass block of the Albada finder at 4 and the image defining frame of the latter at 5. The mirror arranged in the glass block 4 according to the invention is shown at 6. On the right part of FIG. 1 the indicating device of the built-in exposure meter can be seen. The pointer position of the latter is reflected by mirror 7 through lens 8 and by mirror 6 into the finder image. The indicating device (which is known by itself) of the exposure meter consists of the coil instrument 9 and the exposure meter pointer 11, which is rotatable with shaft 10, the deflection of said pointer being controlled by the light incident in the exposure meter window 12. Parts 9, 10, 11 are housed by casing 13, in the upper wall of which an arcuate viewing opening 14 is provided, which, in turn, can be seen through window 15 in the camera cap 2. Above the opening 14 a follow-up pointer 16 is arranged, which is caused to swing about the axis of its shaft 17 by a transmission gear, in conformity with the adjustment of the shutter time and diaphragm. The parts are correlated in such a manner that—when the exposure meter pointer 11 and the follow up pointer 16 coincide in the manner shown in FIG. 2—adjustments of the exposure time and of the diaphragm take place correctly in accordance with the deflection of the exposure meter pointer 11. The adjustment of exposure meter pointer 11 to coincide with follow up mark 16 could be directly observed by the operator of the camera through window 15 in the camera cap 2. However, thereby the operator would have to look into the camera from the upper side, while in selecting the motif the camera would have to be placed again in front of the eye in order to render observation through the finder possible. In the device according to the present invention, these two observations are combined by reflecting the pointer position of the exposure meter into the range of vision of the view finder, so that said position is visible by one look, simultaneously with the observation of the image. Thereby, the opening 14 and the ends of pointers 11 and 16, are reflected through a window 18 provided on the lower side of casing 13, over mirrors 7 and 6 into the eye of the operator. In this path of rays the lens 8 is inserted, which forms an image of the reflected image at about infinite. In window 15, a diffuser disc 19 is provided in camera cap 2, and which can be folded in front of the window in order to regulate the clearness of the pointer image in dependence on the prevailing light conditions.

Figure 2:
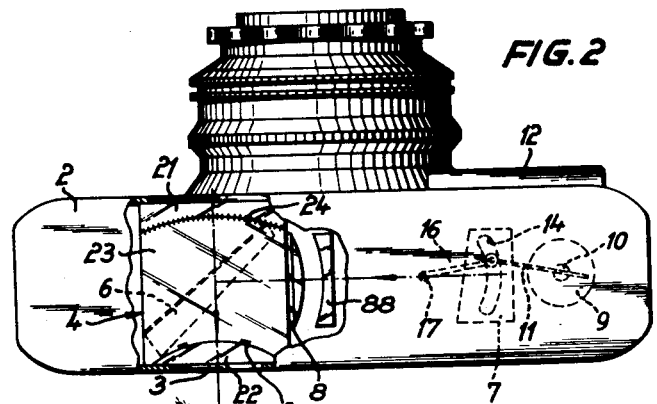
FIG. 2 is a top plan view of the camera shown in FIG. 1.

In FIG. 2, the further course of rays of the pointer reflection from mirror 6 to the eye 20 can be seen. The structure of the Albada finder is also diagrammatically shown in this figure. The finder consists of a unitary glass block composed of the objective lens 21, ocular lens 22 and the intermediate part 23 connecting said lenses. The semi-metalized surface 24 images the image-limiting frame 5—which is arranged in the cemented surface between ocular lens 22 and intermediate part 23—at about infinite. The lens 8 is cemented to the intermediate part 23 and forms thus a structural unit with the finder 4. Differing from the illustration in FIG. 1, FIG. 2 additionally shows a lens 88. The latter can be inserted in front of lens 8, in the direction of the light, as a so-called Brugge's lens, if a reduction of the reflected pointer image offered to the eye, is desired.

Figure 3:
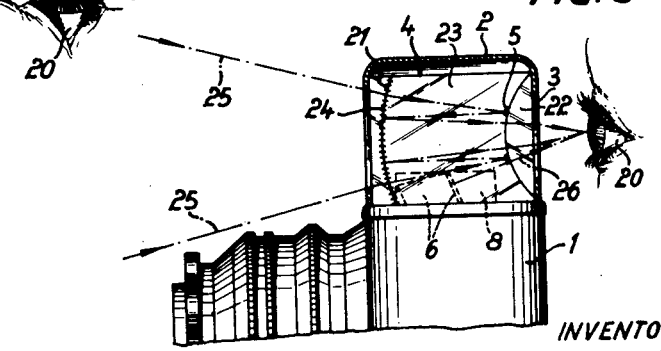
FIG. 3 is a side elevation view of the camera shown in FIGS. 1 and 2.

FIGURE 3 illustrates the path of rays upon looking through the finder. It can be seen that the path of rays 25 from the object, together with the image limiting frame 5 (which is reflected over partially permeable mirror 24) and, simultaneously, the path of rays 26 reflected by mirror 6, which images the exposure meter adjustment, reach the eye 20. In order that the reflected image of the exposure meter indication, at normal position of the eyepoint, be deflected into the pupil, the mirror, which is inclined by 45° relative to the optical axis, is arranged with an additional inclination of about 6° relative to the supporting surface of the finder. In conformity with this inclination, mirror 7 too, (see FIGS. 1 and 2) is inclined, in addition to 45° relative to its supporting surface, by an additional 84° relative to the longitudinal axis of the camera cap.

Upon looking through the finder, the operator observes a picture shown, by way of example, in FIG. 4. In this picture, the opening 14 and, in the latter, the position of the exposure meter pointer 11 and of the follow-up pointer 16, can be seen below the frame 5, with the same sharpness as the landscape and the frame 5 appearing in the landscape. The surroundings of opening 14 appear as a dark surface 27 having sharp contours particularly at its upper edge close to the lower edge of frame 5, separated from the object image. The sharp limits are due to the contours of mirror 6.

FIGURES 5–9 serve to illustrate the particular design of finder 4 with regard to the arrangement of mirror 6 and of lens 8.

In FIG. 5 the finder appears in the same arrangement as in FIG. 2, but on an enlarged scale. The mirror 6 is arranged at an angle of 45° relative to the optical axis 28, so that the reflected path of rays 26 from the exposure meter indication is deflected perpendicularly in the direction of the eye 20.

FIGS. 6 and 7 show how the mirror 6 is inserted in finder 4. Under angle α (see FIG. 5) a saw gap 29 of such depth and width is provided that mirror 6—with consideration of its inclination $\beta = 84°$ relative to the seat or supporting area—can be conveniently inserted in gap 29, without coming in contact with the side walls of the gap.

FIG. 6 shows an exact cross-section through mirror 6, which is fastened by a cement 30 having preferably the same index of refraction as the surrounding glass 23, in gap 29. Mirror 6 is applied to a carrier, e.g. a ground glass plate 31. This plate 31 is beveled on its longitudinal edge extending into the interior of the finder in order to prevent the deposition of air bubbles upon pouring in the cement 30.

FIG. 7 illustrates the finder 4 in a section along the mirror surface. Thereby the gap 29 can be seen, which, in the example shown, is not completely filled in its entire length by mirror 6, and contains on its left side the cement filling 30 only. It is likewise possible to arrange the mirror 6 e.g. in such a manner that the gap 29 remains without mirror coating at its both ends.

As can be seen from FIGS. 1–7, the mirror plate 31 is not of a rectangular, but of trapezoidal shape or design. This design is particularly shown in a somewhat exaggerated manner in FIG. 8. This figure shows that mirror plate 31 becomes lower in the direction toward the object to such an extent as necessary within the finder with regard to the path of the object rays 25, in order to avoid cutting off of parts of the image.

FIGURE 9 is a further general view of the structural unit consisting of the Albada finder proper 4, mirror 6 and lens 8. In order to prominently show the mirror 6, its surface has been cross-hatched in this figure. The mirror plate 31 which is beveled on its upper edge, can be also seen and it has the same length as the gap 29 in this case. The path of the object rays 25 extends through the middle of the finder 4, through center mark 32 of frame 5 to the eye 20 and, simultaneously, the path of reflected rays 26 with the exposure meter indication is reflected by mirror 6 from the lower part of finder 4 into the eye 20.

The finder having the structure described can be handled easily and can be inserted in a camera conveniently without the necessity of adjustments between its individual parts. Its manufacture is simple and economical. It is, for example, of particular advantage that polishing operations for gap 29 and the plane surface of lens 8 are not necessary, because the rough cutting edges become almost invisible due to the connection with the cement.

According to a further embodiment of the invention, the lens 8 used for imaging the indicating device at infinite, can be dispensed with if the reflected rays are directed to the eye by a suitably dimensioned concave mirror. In this case, the indicating device of the exposure meter can be arranged in the camera e.g. in such a manner that it is located directly over the glass block of the Albada finder.

FIG. 10 illustrates an Albada finder, above which the pointer 11 of the exposure meter and the follow up pointer 16 are arranged. Below the overlapping range of the two pointers, in the middle part 123 of the finder, a mirror 106 is inserted in the manner already described above. The surface of objective lens 121 turned toward the middle part 123 is subdivided in such a manner that its greatest part is provided with the conventional semipermeable mirror coating 122 for imaging the frame 5, while its upper part has a zone 124 which extends over the entire width of the finder and is provided with a fully reflecting layer. The latter reflects the pointer image, reflected into the finder by mirror 106, to the eye 20. The length of the image path is thereby selected in such a manner that imaging of the pointer too takes place at infinite, due to the action of concave mirror 124. This example is based on the assumption that the image path for the exposure meter pointer, and that for the frame to be reflected, are of equal length. Thus, both images can be reflected by an equal spherical curved surface on the backside of lens 121 and imaged at infinite for the eye 20. In this case, the operator will see the pointer image above the picture motif and above the frame 5.

FIGS. 11 and 12 show embodiments in which the pointer device to be reflected is further spaced from the finder block, so that its imaging at infinite requires a concave mirror of longer focal length than that necessary for the mirror for imaging the frame.

FIG. 11 illustrates a finder in perspective view in a manner similar to the illustration in FIG. 9. In order to simplify illustration, the indicating device 11, 16 of the exposure meter is arranged at a greater distance above the finder. In practice, the indicating device will be located, in accordance with FIGS. 1 and 2, beside the finder, but this has no influence on the principle to be illustrated. It can be seen in FIG. 11 that the lens 8 (see FIG. 9) has been omitted and that the mirror, denoted 6 in FIG. 9, appears in FIG. 11 as mirror 106 which is perpendicular to the finder axis and is inserted with a somewhat greater inclination than 45° in the upper side of the middle part 223 of the finder. The surface of the objective lens 221, turned toward the middle part 223, consists of two surfaces of different curvature, i.e. of the more sharply curved surface 224 provided with a partially permeable mirror coating and second surface 225, which joins the upper part of surface 224, and is of less sharp curvature and has a full mirror coating. Said surface 224 images the frame 5 and surface 225 the indicating device 11, 16, at infinite.

In order to produce the above described mirror surfaces 224 and 225, the entire surface of the objective lens, turned toward the intermediate finder part 223, should first be given the more strongly curved spherical grinding, from which, subsequently, part 224, having a lesser spherical curvature, is then ground in the desired width. The counter surfaces on intermediate part 223 are subjected to a corresponding treatment and, after application of the partially or fully reflecting mirror layer, the adjacent surfaces are cemented in conventional manner to each other so that the mirror surfaces are located with full protection within the finder block.

In the embodiment illustrated in FIG. 12, the separating surface which carries the partially permeable hollow mirror 324, between the objective lens 321 and the intermediate finder part 323, is left in its upper section 325 without a reflecting layer and the objective lens 321 is subdivided by an additional spherically curved separating surface 300, to the upper section of which a fully reflecting mirror 326 is applied, the area of said mirror 326 corresponding to the area of the non-reflecting zone 325 on the separating surface between the objective lens and the intermediate finder part. Thus, the path of rays for forming the pointer image extends from mirror 106—which has already been described in connection with FIGS. 10 and 11—through the non-reflecting zone 325 to concave mirror 326, the curvature of which is selected in such a manner that the mirror yields the image of pointers 11 and 16 to the eye 20 at about infinity, whereby the image-limiting frame 5 is observed by the eye over semi-mirror 324, likewise at about infinity.

FIGS. 13a and 13b illustrate particularly advantageous designs of the diffuser disk which is denoted 19 in FIG. 1 and can be inserted in front of window 15 of camera cap 2, at poor light conditions. The lower surface 400 of said disk is roughened in the manner conventional in ground-glass plates, while the upper side is provided with grooves 401 similar to those of an echelon lens, by which particularly the light incident in the direction 402 of picture-taking is conducted into window 15 of camera cap 2. The diffuser disk 419 shown in FIG. 13a is of uniform thickness, while the disk 420 shown in FIG. 13b is of increasing thickness in backward direction so that its individual steps can take up still more frontal light than in horizontal arrangement of the steps.

In order to increase freedom with regard to construction, according to a further embodiment of the invention, instead of the pointers proper, a real intermediate image of the pointers can be radiated into the finder block. It is thereby possible, by corresponding selection of the optical means used, to image the indicating device in the finder from any practically possible distance.

Such an arrangement is illustrated in FIG. 14. In the latter, the pointer arrangement is shown at 11 and 16; the light entrance window provided in the camera cap 502 is shown at 515, the photo cell at 500 and the coil instrument of the exposure meter at 509. 507 denotes a deflecting mirror fastened in the camera cap 502. The path of rays 501, which forms the image of the indicating device, extends from mirror 507 through a lens 503, which is cemented to the finder block and forms a real intermediate image in the plane of mirror 506. This mirror 506 is applied, for example, in a particularly simple arrangement, to the surface 508 (produced by grinding) on that side of the finder block which is opposite to lens 503. According to a further feature of the invention, the surface dimensions of said mirror 506 are selected in such a manner that it simultaneously defines the limitation of the pointer image. From mirror 506, the pointer image is reflected to the eye 20—in accordance with the examples already described above—by concave mirror 524, as an image at about infinity. It is possible also in this system to arrange the surface carrying the hollow mirror separately from the surface used for reflecting the image field frame 5, for example in the manner shown already in FIGS. 11 and 12. The example according to FIG. 14 represents, as a modification of the preceding figures, and arrangement in which movement of the pointers 11, 16 takes place in a plane which is perpendicular to the finder axis. Thereby the pointer image will appear to the operator on the left side relative to the image field frame. However, by suitable changes in the arrangement of the individual structural parts it is also possible to obtain the image on the right relative to the image field frame, or above or below the same. Moreover, by the use of an additional mirror it is possible to arrange the pointer instrument and the follow up pointer in such a location that their axes are perpendicular relative to the position shown in FIG. 14.

It will be understood from the above that this invention is not limited to the specific designs, arrangements and other details specifically described above and illustrated in the drawings and can be carried out with various modifications without departing from the scope of the invention as defined in the appended claims.

The aforementioned follow-up pointer 16 can be coupled in any way with the time-, diaphragm- or light value setter of the camera, as per example shown by the diaphragm pointer 35 in the U.S. specification No. 2,358,084, by Mihalyi.

What is claimed is:

1. In a photographic camera including a built-in exposure meter having an indicator pointer, a built-in block type Albada finder including front optical means having a concave inner surface, rear optical means having a convex surface facing said concave surface, an intermediate optical block member having curved end surfaces substantially conforming and cemented to said concave surface and said convex surface, a partially light-permeable mirror arranged in the interface between said concave surface and the adjacent end surface of said block member, and a picture limiting frame on said convex surface in substantially the focal plane of said partially permeable mirror for reflection thereby at substantial infinity: an improved arrangement for providing, in the field of view of said finder, an image of said pointer at substantially infinity, said arrangement comprising, in combination, optical means disposed in the path of light rays from said pointer, and including a mirror mounted within said block member and lying in a plane oblique to the optical axis of said Albada finder, for directing light rays from said pointer into said block member and reflecting the light rays entering said block member from said pointer through said rear optical means to provide an image of said pointer in the field of view of an observer looking through said Albada finder.

2. A photographic camera as claimed in claim 1, in which said oblique mirror is positioned in said intermediate block member laterally outside of the path of light rays passing between said frame, said partially permeable mirror, and the eye of an observer.

3. A photographic camera as claimed in claim 2, in which said arrangement includes a lens means arranged in the path of the light rays in front of the oblique mirror in the image forming direction, for forming an image of the exposure meter pointer at substantially infinity.

4. A photographic camera as claimed in claim 1, including a concave mirror mounted in said finder in the path of rays reflected from said oblique mirror and having a curvature such as to provide an image of said exposure meter pointer at substantially infinity in the field of view through said Albada finder.

5. A photographic camera as claimed in claim 4, in which said concave mirror for imaging said pointer at substantially infinity is positioned on the same surface as that carrying said partially light permeable mirror.

6. A photographic camera as claimed in claim 4, in which the concave mirror for forming an image of said pointer is arranged on a surface which joins the carrier surface for said partially light permeable mirror, but has a curvature different therefrom.

7. A photographic camera as claimed in claim 6, in which the surface carrying the concave mirror for imaging said pointer has a larger radius of curvature than the concave surface carrying the partially permeable mirror.

8. A photographic camera as claimed in claim 4, in which the concave mirror for forming an image of said pointer at substantially infinity, is arranged in the finder front optical means on a particular concave surface which forms a cemented interface of said Albada finder.

9. A photographic camera according to claim 8, in which the concave surface which carries the partially permeable mirror for imaging said picture limiting frame, and which follows said concave mirror in the direction of incident light, being left free of said partially light permeable mirror on that part thereof which is opposite to said concave mirror so that the path of rays derived from the pointer can pass therethrough without obstruction.

10. A photographic camera as claimed in claim 2, in which the intermediate block member has a substantially rectangular cross section and the plane oblique mirror is substantially rectangular in plan; said oblique mirror having its outer edge in a plane parallel to an outer lateral surface of said intermediate block member and having its mirrored surface inclined toward said plane at an angle of substantially 84 degrees; the opposite edge of said oblique mirror forming, with the projection into this plane of the optical axis of the finder, an angle of substantially 45 degrees.

11. A photographic camera as claimed in claim 10, in which the oblique mirror is disposed in a recess in the intermediate block member; the inner edge of the oblique mirror being projected into a lateral surface of the block member which is perpendicular to a plane perpendicular to the optical axis of the finder; the projection of the inner edge of the oblique mirror in this lateral surface being inclined in a direction to the outer end of the finder and forming, with a plane which is perpendicular to the optical axis of the finder, an angle substantially equal to the angle formed by the marginal rays of the light, passing through the finder to the eye, with the optical axis of the finder.

12. A photographic camera as claimed in claim 2, in which said intermediate block member has a substantially rectangular cross section and said mirror is substantially rectangular in plan and seated in a recess in the block member adjacent the upper lateral surface of the block member; the upper edge of the mirror being disposed in a plane parallel to the upper lateral surface of the intermediate block member and being inclined toward this plane in a direction toward the outer end of the finder; the mirrored surface of the oblique mirror forming, with a plane parallel to the upper lateral surface of the intermediate block member, an angle of substantially 45 degrees; the upper edge of the oblique mirror forming, with the optical axis of the finder as projected into such plane, an angle of substantially 90 degrees.

13. A photographic camera as claimed in claim 1, in which said oblique mirror is embedded in a recess of the block member by means of a light-permeable cement having about the same index of refraction as the glass of the block member.

14. A photographic camera as claimed in claim 13, in which said arrangement provides the pointer image as a silhouette in the field of view of the finder, but outside the reflected frame in the field of view.

15. A photographic camera as claimed in claim 14, comprising a camera cap housing the exposure meter and the Albada finder; said camera cap having an opening for the incidence of light; and a diaphragm arranged in front of and illuminated through said opening, appearing in the field of view and includes the swinging range of the pointer located in the direction of light incidence.

16. A photographic camera as claimed in claim 15, comprising a diffuser disc arranged in front of the opening provided in the camera cap.

17. A photographic camera as claimed in claim 16, in which the diffuser disc has a serrated outer surface and a fine-frosted inner surface.

18. A photographic camera as claimed in claim 1, in which said arrangement includes, outside the block member a mirror for deflecting the light rays incident from said pointer to said oblique mirror located within said body member.

19. A photographic camera as claimed in claim 1, in which said arrangement includes, optical means effective to produce a real intermediate image of the pointer, and means for reflecting said real image into the finder.

20. A photographic camera as claimed in claim 19, in which said arrangement includes, in the plane of the real image, a diaphragm, the size of which latter corresponds to the range of movement of the pointer means.

21. A photographic camera as claimed in claim 20, in which the diaphragm is formed by a mirror for deflecting the light rays incident from the pointer to the finder.

References Cited in the file of this patent

UNITED STATES PATENTS

| | | |
|---|---|---|
| 2,127,925 | Leitz | Aug. 23, 1938 |

FOREIGN PATENTS

| | | |
|---|---|---|
| 466,923 | Great Britain | June 8, 1937 |
| 521,491 | Great Britain | May 23, 1940 |
| 545,836 | Great Britain | June 16, 1942 |